US 8,656,162 B2

(12) United States Patent
Roy et al.

(10) Patent No.: US 8,656,162 B2
(45) Date of Patent: Feb. 18, 2014

(54) AERONAUTICAL SECURITY MANAGEMENT OVER BROADBAND AIR/GROUND NETWORK

(75) Inventors: Aloke Roy, Gaithersburg, MD (US); Michael L. Olive, Cockeysville, MD (US)

(73) Assignee: Honeywell International Inc., Morristown, NJ (US)

( * ) Notice: Subject to any disclaimer, the term of this patent is extended or adjusted under 35 U.S.C. 154(b) by 829 days.

(21) Appl. No.: 12/603,635

(22) Filed: Oct. 22, 2009

(65) Prior Publication Data
US 2011/0099371 A1 Apr. 28, 2011

(51) Int. Cl.
*H04L 9/32* (2006.01)
(52) U.S. Cl.
USPC .......... 713/168; 713/167; 701/1; 701/10; 701/11; 340/541; 340/945
(58) Field of Classification Search
USPC ......... 709/223, 224; 370/389; 706/53; 701/9, 701/11, 24, 25, 1, 10, 16; 713/168, 167; 725/106; 340/541, 945
See application file for complete search history.

(56) References Cited

U.S. PATENT DOCUMENTS

| | | | |
|---|---|---|---|
| 6,278,913 B1 * | 8/2001 | Jiang | 701/3 |
| 7,183,946 B2 * | 2/2007 | Boudrieau | 340/945 |
| 7,406,368 B2 * | 7/2008 | Arnouse | 701/3 |
| 7,466,980 B2 | 12/2008 | Kauffman et al. | |
| 7,505,736 B2 | 3/2009 | Min | |
| 2003/0058135 A1 * | 3/2003 | Kimmet | 340/945 |
| 2003/0068044 A1 * | 4/2003 | Nikolsky | 380/258 |
| 2003/0158957 A1 * | 8/2003 | Abdolsalehi | 709/231 |
| 2004/0107027 A1 * | 6/2004 | Boudrieau | 701/1 |
| 2004/0160340 A1 * | 8/2004 | Thomson et al. | 340/945 |
| 2004/0246131 A1 * | 12/2004 | Hodgkinson | 340/541 |
| 2005/0053026 A1 | 3/2005 | Mullan et al. | |
| 2005/0187677 A1 * | 8/2005 | Walker | 701/16 |
| 2005/0240756 A1 * | 10/2005 | Mayer | 713/2 |
| 2006/0025900 A1 * | 2/2006 | Arnouse | 701/10 |
| 2006/0167598 A1 * | 7/2006 | Pennarola | 701/11 |
| 2006/0206246 A1 * | 9/2006 | Walker | 701/16 |
| 2007/0042774 A1 | 2/2007 | Alcorn | |
| 2007/0115938 A1 | 5/2007 | Conzachi et al. | |
| 2007/0127460 A1 * | 6/2007 | Wilber et al. | 370/389 |

(Continued)

FOREIGN PATENT DOCUMENTS

EP 1429518 6/2004

OTHER PUBLICATIONS

European Patent Office, "European Search Report", Jul. 15, 2008, Published in: EP.

(Continued)

*Primary Examiner* — Thu Ha Nguyen
(74) *Attorney, Agent, or Firm* — Fogg & Powers LLC

(57) ABSTRACT

A method to facilitate securing of air-to-ground communications for an aircraft is provided. The method includes receiving security management information at the aircraft via at least one broadband data link prior to takeoff of the aircraft. The security management information is received for ground entities that can be communicatively coupled with the aircraft traveling on a flight path. The method of securing avionics also includes validating the security management information for the ground entities, and storing the validated security management information for the ground entities in the aircraft. The validating and storing of security management information occur prior to takeoff of the aircraft.

20 Claims, 4 Drawing Sheets

(56) References Cited

U.S. PATENT DOCUMENTS

| | | | |
|---|---|---|---|
| 2007/0130599 A1* | 6/2007 | Monroe | 725/105 |
| 2007/0183435 A1* | 8/2007 | Kettering et al. | 370/401 |
| 2007/0239986 A1* | 10/2007 | Viggiano et al. | 713/168 |
| 2008/0086554 A1* | 4/2008 | Royalty | 709/224 |
| 2008/0102824 A1* | 5/2008 | Kauffman | 455/431 |
| 2008/0144617 A1* | 6/2008 | Molsberry et al. | 370/389 |
| 2009/0092074 A1 | 4/2009 | Jamalipour et al. | |
| 2009/0133112 A1 | 5/2009 | Kauffman et al. | |
| 2009/0177614 A1* | 7/2009 | Angell et al. | 706/53 |
| 2009/0177615 A1* | 7/2009 | Angell et al. | 706/53 |
| 2010/0013628 A1* | 1/2010 | Monroe | 340/539.18 |
| 2010/0333156 A1* | 12/2010 | Abdolsalehi | 725/106 |

OTHER PUBLICATIONS

"Eurocontrol Specification on the Air Traffic Services Message Handling Systems (AMHS)""http://www.eurocontrol.int/ses/gallery/content/public/docs/pdf/ses/spec_amhs_v2.0_signed_full.pdf accessed Jan. 4, 2011", Sep. 18, 2009, pp. 43-45, Publisher: Eurocontrol.

Olive, Michael, "Efficient Datatlink Security in a Bandwidth-Limited Mobile Environment—An Overview of the Aeronautical Telecommunicati", "Digital Avionics Systems", 2001, pp. 9.E.2-1 thru 9.E.2-10, vol. 2, Publisher: IEEE.

Patel, Vic, "Public Key Infrastructure for Air Traffic Management Systems", "Digital Avionics Systems", 2001, pp. 7.A.5-1 thru 7.A.5-7, vol. 2, Publisher: IEEE.

European Patent Office, "Office Action", Aug. 31, 2011, Published in: EP.

European Patent Office, "Communication under Rule 71(3) EPC", "from Foreign Counterpart of U.S. Appl. No. 12/603,635", May 16, 2013, pp. 1-29, Published in: EP.

* cited by examiner

AERONAUTICAL SECURITY MANAGEMENT OVER BROADBAND AIR/GROUND NETWORK

BACKGROUND

Currently, information security requirements for aeronautical communications systems have been specified in International Civil Aviation Organization (ICAO) Document 9705, ICAO Document 9880, and ARINC Incorporated Specification 823. These aeronautical security solutions are designed for communications over low-bandwidth air/ground data links such as Aircraft Communications Addressing and Reporting System (ACARS) and very-high-frequency data link (VDL) Mode 2.

The optimization necessary for those low-bandwidth security solutions introduces computational complexity in both air and ground implementations. In addition, key and certificate management for secure communications between an aircraft and a ground-based communicating entity (referred to herein as a ground entity) has not been fully defined and/or resolved by the aeronautical industry. Although AEEC and Air Transport Association (ATA) Digital Security Working Groups (DSWG) have addressed some of the security management issues, the proposed solutions rely heavily on procedures requiring human interventions or assume continuous connectivity between an airborne aircraft and the ground entities (e.g., high-bandwidth air/ground data links). Those security management solutions also require the aircraft to depend on the ground entities to perform some of the certificate management tasks of its behalf.

SUMMARY

The present application relates to a method to facilitate securing of air-to-ground communications. The method includes receiving security management information at the aircraft via at least one broadband data link prior to takeoff of the aircraft. The security management information is received for ground entities that can be communicatively coupled with the aircraft traveling on a flight path. The method to facilitate the securing of air-to-ground communications also includes validating the security management information for the ground entities, and storing the validated security management information for the ground entities in the aircraft. The validating and storing of security management information occur prior to takeoff of the aircraft. The details of various embodiments of the claimed invention are set forth in the accompanying drawings and the description below. Other features and advantages will become apparent from the description, the drawings, and the claims.

DRAWINGS

The present invention is illustrated by way of example and not limitation in the accompanying figures, in which like reference numbers and designations in the various drawings indicate like elements, and in which.

DETAILED DESCRIPTION

Figure 1:
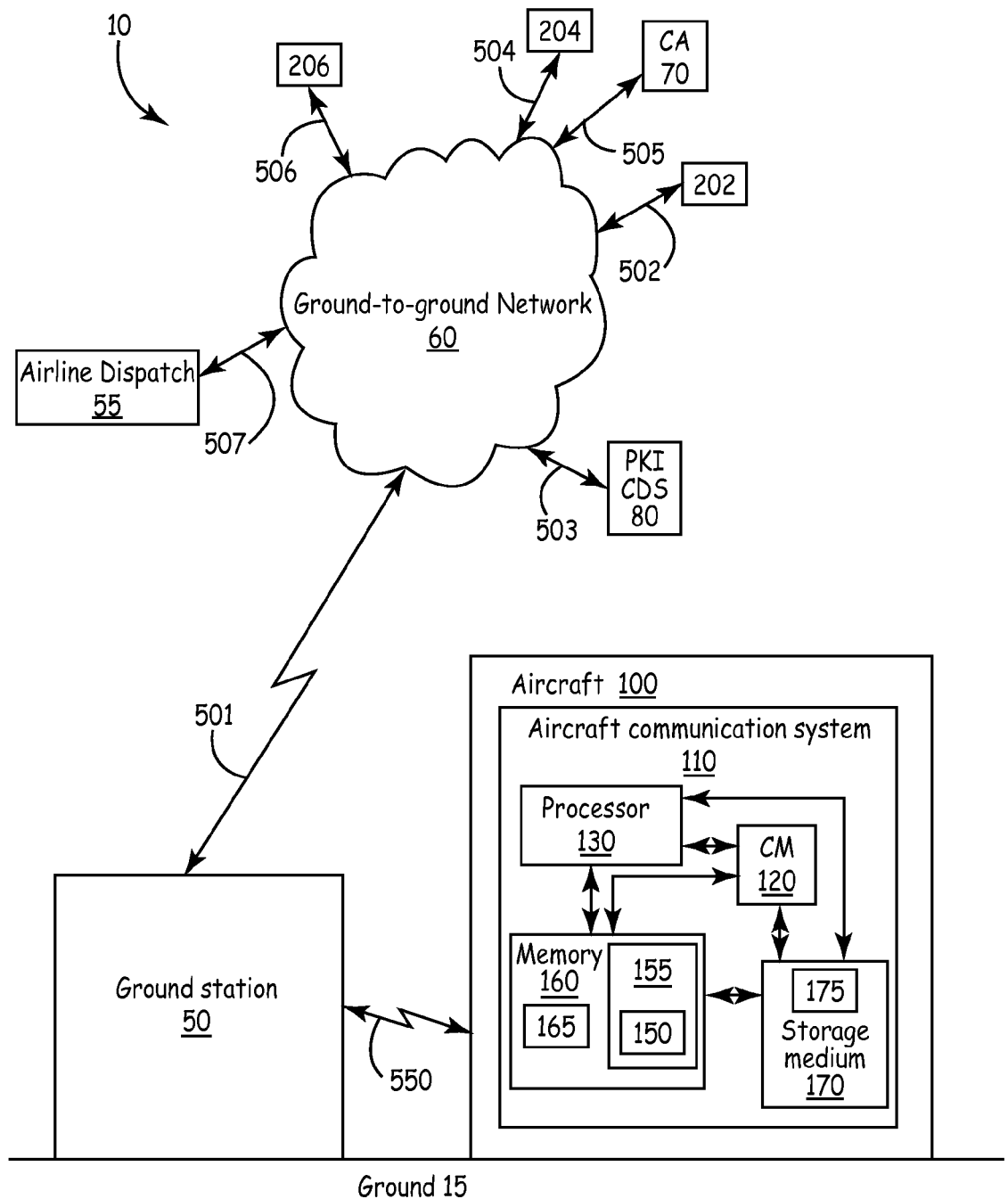
FIG. 1 is an aircraft on the ground prior to take-off communicatively coupled to the ground entities via a broadband air/ground data link in accordance with the present invention.

As described above, currently available security practices for aeronautical communications systems are not optimized for aircraft in communication with ground-based entities. For example, terrestrial broadband connectivity is readily available. However, an aircraft may not have broadband connectivity to ground systems while in-flight. This is one reason for the complexity of optimization of the low-bandwidth (or bandwidth constrained) security solutions in air-to-ground implementations described in the background.

Also, since air/ground communication charges are primarily usage based (i.e., based on the number of bits transferred over the air/ground connection), users, such as airlines and aircraft operators, want to reduce the amount of information transferred in-flight to reduce costs. Broadband air/ground networks may eventually be widely available. However, the overall capacity on the available networks will be significantly lower than the capacity available on the ground.

The systems and methods described herein are used to obtain necessary security management information, such as public key certificates and certificate revocation lists, in an aircraft using broadband air/ground data links available while the aircraft is on the ground, e.g., at an airport terminal. The aircraft is thus prepared to establish secure communications with peer ground entities with which it expects to communicate during the flight. Since the security management information is obtained prior to take-off, this information can be used to establish secure communications with the ground entities with which it expects to communicate during the flight. This eliminates the need to use bandwidth-constrained data links linking the in-flight aircraft to the ground entities to obtain the security management information while in-flight. This frees up the bandwidth-constrained data links for other protected information transfers that are essential for safety and regularity of the flight. This approach also minimizes the need for procedure-based solutions with human intervention.

As described herein, the aircraft avionics includes an aircraft communication system, which, prior to take off, manages the aircraft security certificates, manages the ground entity security certificates, and manages certificate revocation lists via data links that provide broadband connectivity. The aircraft communication system also establishes security relationships (session keys) with the peer ground entities over broadband air/ground data links while the aircraft is on the ground. Once the aircraft takes off, the aircraft may not have broadband connectivity to ground systems throughout the duration of the flight. The aircraft communication system manages the previously established security relationships (session keys) to communicate with ground entities during the flight of the aircraft. Specifically, the aircraft communication system uses the previously established security relationships to communicate with the ground systems via bandwidth-constrained data links. Thus, the aeronautical security management solution described herein addresses all of the problems mentioned above and offers an optimized solution for the users.

As defined herein "avionics" includes the electrical and electronic devices used in the operation of aircraft. Aircraft includes airplanes, jets, helicopters, and unmanned aerial vehicles. As defined herein, a data link is the means of connecting one location to another for the purpose of transmitting and receiving digital information. It includes the electronics assemblies (e.g., a transmitter and a receiver) and the interconnecting data telecommunication circuit. Data links are governed by a link protocol enabling digital data to be transferred from a data source to a data sink. As defined herein, the term bandwidth-constrained data link applies to either 1) data links that transport data at low-bandwidths or 2) broadband data links that are constrained from sending data at high data rates due to constraining limitations that are external to the link itself. Such constraining limitations include, but are not limited to, the protocols used by the aircraft, protocols used by the ground entities, bandwidth limitations due to traffic congestion at a ground entity, and lack of certificate of an air/ground network (or portion of the air/ground network) for air traffic management applications.

FIG. 1 is an aircraft 100 on the ground 15 prior to take-off communicatively coupled to the ground entity 50 via a broadband air/ground data link 550 in accordance with the present invention. The aircraft 100 includes an aircraft communication system 110. The aircraft communication system 110 includes at least one processor 130, a communication manager (CM) 120, a storage medium 170, and a memory 160 that has stored a flight plan 155 including a list 150 of ground entities 50, 202, 204, and 206 associated with the flight plan 155 for the next flight of the aircraft 100. The processor 130, the communication manager 120, the storage medium 170, and the memory 160 are communicatively coupled with each other. In one implementation of this embodiment, the communication manager is an avionic communication manager. In another implementation of this embodiment, the communication manager is a communication management unit.

The communication manager 110 validates security management information for the ground entities 202, 204, and 206 and stores the validated security management information for the ground entities in a memory 160 in the aircraft 100. The security management information includes certificates and certificate revocation lists (CRLs). In some embodiments, the communication manager 110 establishes secure associations for the ground entities 202, 204, and 206 while the aircraft is on the ground 15. In such embodiments, the communication manager 110 stores security parameters associated with the secure associations for the ground entities in the memory 160 on the aircraft 100. The security parameters can include random numbers, keys, and message counters.

The communication manager 120 and the aircraft communication system 110 have appropriate interfaces (not shown) to communicatively couple via broadband data link 550 with the ground entity 50 that is located within communication range of the aircraft 100. As shown in FIG. 1, the ground entity 50 is a ground station 50. The ground entity 50 is communicatively coupled to the ground-to-ground network 60 via communication link 501. The ground-to-ground network 60 is communicatively coupled to a plurality of ground entities 55, 70, 80, 202, 204, and 206. The aircraft 100 is thus communicatively coupled to the plurality of ground entities 55, 70, 80, 202, 204, and 206 via the ground-to-ground network 60 and the ground entity 50.

As defined herein, the ground entities can be any combination of air navigation service providers (ANSPs), data link service providers (DSPs), airport authorities, aircraft operator entities (e.g., airline dispatch), and third-party service providers (e.g., fueling, catering), certificate authorities, public key infrastructure certificate distribution services, or other ground stations required to communicate with the pilot or crew during the flight for the safety of the aircraft 100.

In the exemplary embodiment of FIG. 1, the broadband data links 550 and 501, the ground-to-ground network 60, and a broadband data link 505 communicatively couple the aircraft 100 with a certificate authority (CA) 70. The broadband data links 550 and 501, the ground-to-ground network 60, and a broadband data link 503 communicatively couple the aircraft 100 with a public key infrastructure (PKI) Certificate Distribution Service (CDS) 80. In the exemplary embodiment of FIG. 1, the broadband data link 550, the ground-to-ground network 60, and broadband data link 507 communicatively couple the aircraft 100 with airline dispatch 55. The broadband data links 550 and 501, the ground-to-ground network 60, and broadband data links 502, 504, and 506 communicatively couple the aircraft 100 with ground entities 202, 204, and 206, respectively. In one implementation of this embodiment, the respective ground entities 202, 204, and 206 are airline dispatches in air terminals (ground stations) at other locations, over which (or near to which) the aircraft 100 will fly on the flight path identified by the flight plan 155. In another implementation of this embodiment, some of the ground entities, such as airline operations (dispatch and maintenance) are pre-configured.

The public key infrastructure (PKI) is a set of hardware, software, people, policies, and procedures needed to create, manage, store, distribute, and revoke digital certificates. Specifically, a public key infrastructure is an arrangement that binds public keys with respective user identities. The user identities are generated at the certificate authority 70 and sent to the public key infrastructure certificate distribution service 80. The user identity must be unique for each certificate. The certificate revocation list is generated by the PKI Certificate Distribution Service 80. The ground station 50 (or the aircraft 100) requests and receives security management information (e.g., keys, certificates, and certificate revocation lists) for the identified ground entities 202, 204, and 206 from the PKI Certificate Distribution Service 80 via the ground-ground network 60 (e.g., Internet).

The certificate revocation list is a list of certificates (e.g., a list of serial numbers for certificates) that have been revoked or are no longer valid, and therefore should not be relied upon. When the certificate of a ground entity on the flight plan 155 is on the certificate revocation list, the aircraft 100 must obtain the new certificate for that listed ground entity. Certificate and certificate revocation lists are requested and received for ground entities with which the aircraft will communicate during a flight. If an aircraft received a certificate previously and has a copy already stored locally, then the aircraft does not request it again. The certificate revocation list is validated. The received and/or stored ground certificate(s) are also validated. Specifically, each certificate (valid signature, valid usage dates, etc.) is checked for validity and to see if the certificate is on the certificate revocation lists. If a stored certificate is no longer valid, or if a received or stored certificate is on the certificate revocation list, then a new certificate is requested, and once received the newly received certificate is validated in the same way.

The broadband data links 550 and 501-507 are each communication links that can be used to transmit the data at high data rates. The ground-to-ground network 60 is a high-speed network that is capable of sending messages at high data rates. In embodiments, the ground-to-ground network 60 is the Internet 60. The communication links 550 and 501-507 each comprise one or more of a wireless communication link (for example, a radio-frequency (RF) communication link) and/or a wired communication link (for example, an optical fiber or copper wire communication link) The broadband data links 550 and 501-507 may include, but are not limited to, data links configured for standards set by Institute of Electrical and Electronics Engineers (IEEE) 802.11 WiFi, IEEE 802.16 WiMax, 3G cellular, and/or 4G cellular, and SAT-COM.

The storage medium 170 includes software 175 and/or firmware that are executable by the processor 130. At least a portion of such software 175 and/or firmware executed by the processor 130 and any related data structures are stored in storage medium 170 during execution. Although the processor 130 and memory 160 are shown as separate elements in FIG. 1, in one implementation of this embodiment, the processor 130 and memory 160 are implemented in a single device (for example, a single integrated-circuit device). In another implementation of this embodiment, the processor 130 comprises processor support chips and/or system support chips such as application-specific integrated circuits (ASICs).

Memory 160 comprises any suitable memory now known or later developed such as, for example, random access memory (RAM), read only memory (ROM), and/or registers within the processor 130. In one implementation of this embodiment, the processor 130 comprises a microprocessor or microcontroller. In another implementation of this embodiment, the processor 130 is internal to the communication manager 120. In yet another implementation of this embodiment, the processor 130 and the memory 160 are both internal to the communication manager 120.

In yet another implementation of this embodiment, the communication manager 120 is implemented as a software function on a Communication Management Unit/Communication Management Function (CMU/CMF) as a stand-alone line replaceable unit (LRU). In yet another implementation of this embodiment, the communication manager 120 is implemented as a software function on a CMU/CMF including an integrated LRU platform.

The following steps are implemented by the aircraft communication system 110 in a process of receiving and validating security management information at the aircraft prior to take off.

1) Determine the ground entities with which the aircraft expects to communicate.

2) (Optional) Examine local certificate cache in the memory 160 to determine whether previously stored certificate(s) are associated with one or more of the ground entities with which the aircraft expects to communication. The cache can be empty (e.g., when the equipment is first installed).

3) Validate (e.g., signature, timestamp, etc.) certificates obtained from the local certificate cache.

4) Request certificates for ground entities for which no certificate was found in the local certificate cache. Request certificates for those ground entities for which the certificates were not validated (e.g., certificates that are expired).

5) Receive the requested certificates, along with a current certificate revocation list.

6) Validate (e.g., signature, timestamp, etc.) the certificates received in step 5.

7) Validate (e.g., signature, timestamp, etc.) the certification revocation list received in step 5.

8) Ascertain whether any of the validated certificates are revoked (i.e., are listed in the certification revocation list).

9) If a validated certificate is on the certification revocation list, request a new certificate for that ground entity.

10) When a replacement certificate for a ground entity having a revoked certificate is received, validate the received replacement certificate.

Figure 2:
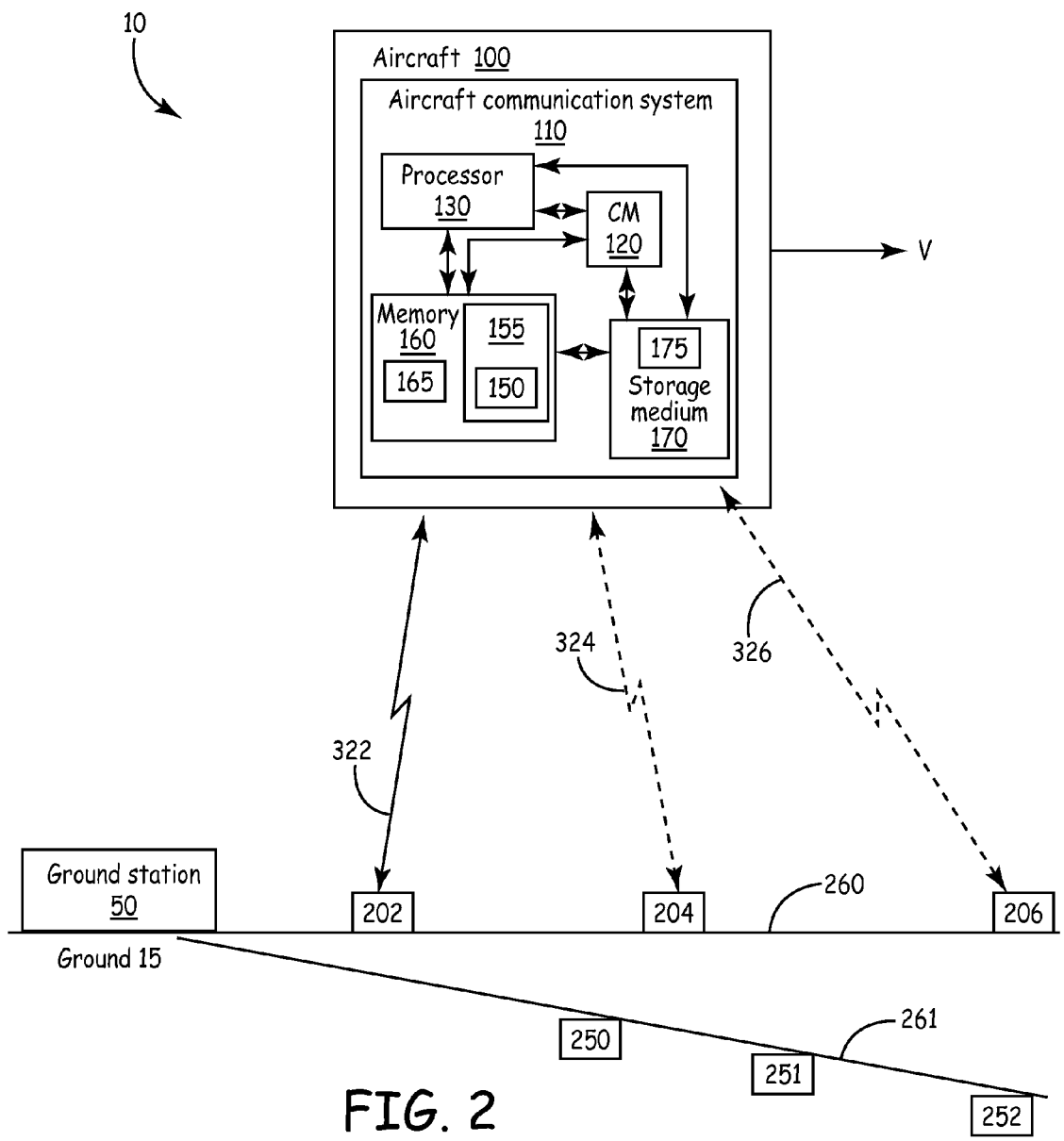
FIG. 2 is the aircraft of FIG. 1 shown using the secure associations established prior to takeoff in order to exchange protected messages while in-flight in accordance with the present invention.

FIG. 2 is the aircraft 100 of FIG. 1 shown using the secure associations, which were established prior to takeoff, in order to exchange protected messages while in-flight in accordance with the present invention. The aircraft 100 flies a flight path according to the flight plan 155. Once the aircraft 100 has left the gate of the ground station 50 (or the ground 15), broadband links may no longer be available or, if available, may not be certified for some uses. In either case, the aircraft 100 reverts to using bandwidth-constrained data links 322, 324, or 326. As shown in FIG. 2, the aircraft 100 is moving with velocity represented generally by the vector V. The bandwidth-constrained data link 322 (shown as a solid line) is being used to exchange protected messages between the in-flight aircraft 100 and the first ground entity 202. When the aircraft 100 moves out of the communication range of the first ground entity 202, the bandwidth-constrained data link 324 (shown as a dashed line) is secured to exchange protected messages between the in-flight aircraft 100 and the second ground entity 204. In one implementation of this embodiment, at least one bandwidth-constrained data link is implemented to exchange the protected messages with the communicatively coupled ground entities while in-flight. In another implementation of this embodiment, at least one broad band data link is used to exchange the protected messages with the communicatively coupled ground entities while in-flight. In yet another implementation of this embodiment, only broad band data links are used to exchange the protected messages with the communicatively coupled ground entities while in-flight.

In order for this handoff to occur without a breach of security, the aircraft communication system 110 detects that a new ground entity (second ground entity 204) is within communication range of the aircraft 100, the processor 130 retrieves the validated security management information for the second ground entity 204, and the processor 130 uses the validated security management information to establish a secure association with the second ground entity 204 and to exchange protected messages with the second ground entity 204. Specifically, the security management information is transferred to the second ground entity 204 along with the first protected message sent to the second ground entity 204 to establish secure communication between the second ground entity 204 and the aircraft 100. In an embodiment in which a secure association was established with the second ground entity 204 prior to takeoff, the processor 103 uses the security parameters associated with the second ground entity 204 to protect messages sent to the second ground entity 204.

Similarly, when the aircraft 100 moves out of the communication range of the second ground entity 204, the bandwidth-constrained data link 326 (shown as a dashed line) is secured to exchange protected messages between the in-flight aircraft 100 and the third ground entity 206. In order for this second handoff to occur, the aircraft communication system 110 detects that a new ground entity (the third ground entity 206) is within communication range of the aircraft 100, the processor 130 retrieves the validated security management information for the third ground entity 206, and the processor 130 uses the validated security management information to establish a secure association with the third ground entity 206 to exchange protected messages with the third ground entity 206. In an embodiment in which a secure association was established with the third ground entity 206 prior to takeoff, the processor 103 uses the security parameters associated with the third ground entity 206 to protect messages sent to the third ground entity 206.

This switching without a breach of security occurs for all the ground stations along the flight path until the aircraft 100 reaches its final destination and lands. The in-flight communication time between the aircraft and the ground stations for the handoff between ground stations is minimized since the validated security management information and/or security parameters are already stored on the aircraft 100.

Thus, the stored security management information and/or the security parameters associated with a secure association established prior to takeoff are used to exchange protected messages, while in-flight, with the ground entities 202, 204, and 206 that are communicatively coupled with the aircraft 100 via data links 322, 324, and 326 as the aircraft 100 travels along the flight path represented generally at 260 shown traced on the ground 15. In one implementation of this embodiment, one or more of the data links 322, 324, and 326 are bandwidth-constrained data links. In another implementation of this embodiment, al the data links 322, 324, and 326 are broadband data links.

In some embodiments, the flight path 260 is a preferred flight path and there is also an alternate flight path represented generally at 261 shown as traced on the ground 15. The alternate flight path 261 is scheduled to be used if adverse weather conditions (or other problems) prevent the aircraft 100 from safely flying the preferred flight path 260. In such an embodiment, security management information for the ground entities 250, 251, and 252 on the alternate flight path 261 are also validated and stored in memory 160 prior to takeoff of the aircraft 100. The validated security management information for the ground entities 250, 251, and 252 are ready for use (if needed) to exchange protected messages, while in-flight, with the ground entities 250, 251, and 252 that are communicatively coupled via respective bandwidth-constrained data links while the aircraft 100 travels along the alternate flight path 261. In embodiments in which the secure associations were established prior to takeoff, the security parameters associated with the secure associations for the ground entities are ready for use (if needed) to exchange protected messages, while in-flight, with the ground entities 250, 251, and 252 that are communicatively coupled via respective data links while the aircraft 100 travels along the alternate flight path 261.

In one implementation of this embodiment, the bandwidth-constrained data links 322, 324, or 326 are configured according to the standards defined by very high frequency (VHF), VHF Data link Mode 2 (VLDm2), or classic aero SATCOM. In another implementation of this embodiment, the aircraft navigation system 10 is air traffic services (ATS) and some aeronautical operational control (AOC) communication is done via ATN/OSI (ICAO Doc. 9880) or ATN/IPS (ICAO Doc. 9896) standards. In yet another implementation of this embodiment, the aircraft navigation system 10 is an airline administrative communications (AAC) and some ATS/AOC communications are done via ACARS (ARINC Standards 618/620/622/623/631/633/823).

Figure 3:
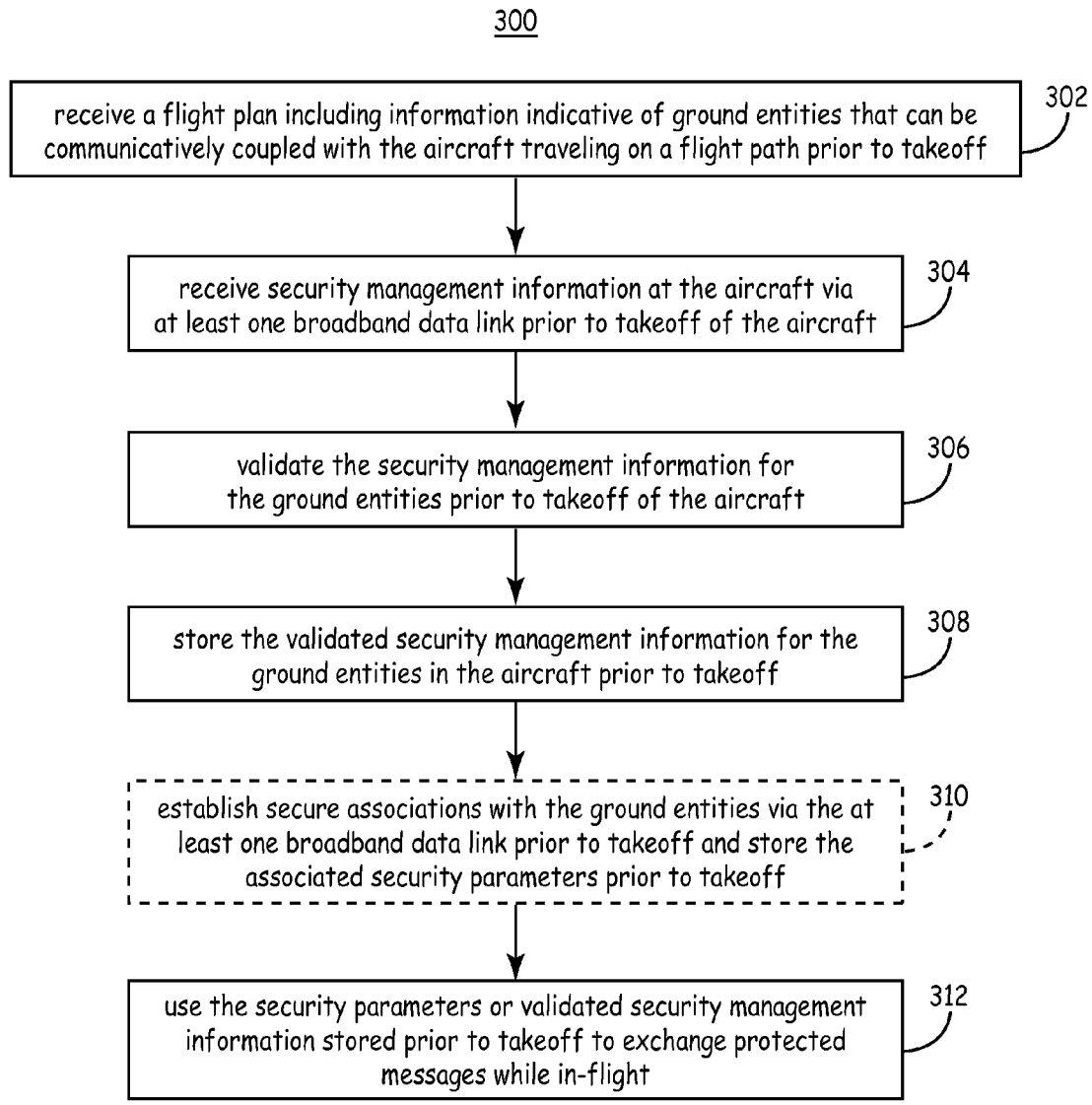
FIG. 3 is a method to facilitate securing of air-to-ground communications for an aircraft in accordance with the present invention.
Figure 4:
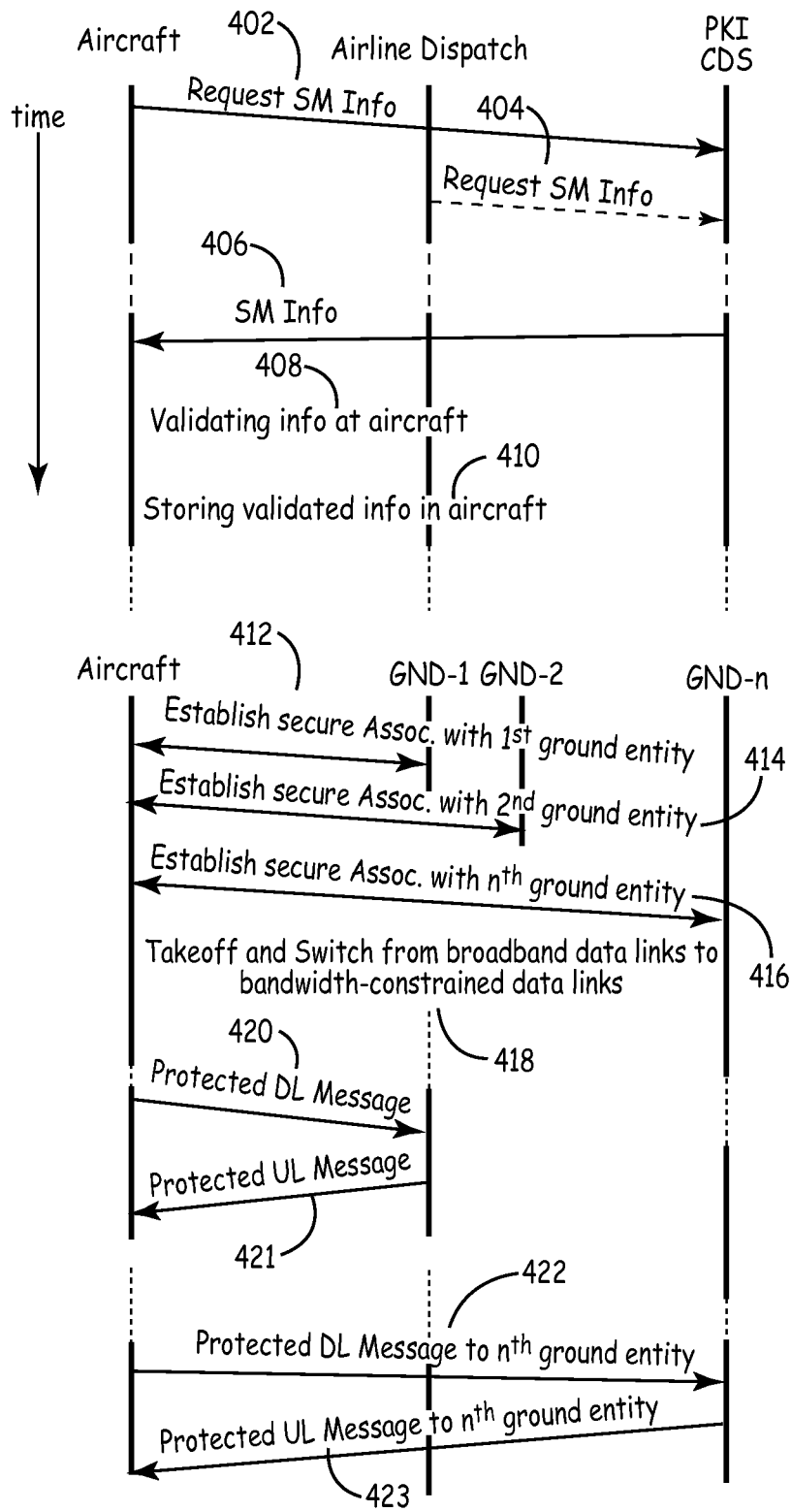
FIG. 4 is an exemplary diagram of transactions to facilitate securing of air-to-ground communications and for using secured avionics in an aircraft in accordance with the present invention.

FIG. 3 is a flow diagram of a method 300 to facilitate securing of air-to-ground communications for an aircraft in accordance with the present invention. FIG. 4 is an exemplary diagram of transactions to facilitate securing of air-to-ground communications and for using secured avionics in an aircraft in accordance with the present invention. FIGS. 3 and 4 are now discussed for the exemplary aircraft 100 and aircraft navigation system 10 shown in FIGS. 1 and 2. The processor 130 executes software 175 and/or firmware that causes the processor 130 to perform at least some of the processing described here as being performed by the aircraft communication system 110. The software 175 and/or firmware executed by the processor 130 comprise a plurality of program instructions that are stored or otherwise embodied on the storage medium 170. The storage medium 170 is a computer readable storage medium 170 storing computer interpretable instructions which cause the processor 130 to facilitate the securing of air-to-ground communications for the aircraft 100. The computer interpretable instructions are interpreted by the processor 130 or the aircraft communication system 110, which have access to the stored list 150 of ground entities 50, 202, 204, and 206 associated with the flight plan 155.

The method 300 can be initiated either by the aircraft 100 or by a ground entity, such as an airline dispatch 55 or airline operations, while the aircraft 100 is parked. The aircraft 100 initiates the method 300 to facilitate securing of air-to-ground communications either automatically or in response to pilot interaction. The airline dispatch 55 (or airline operations) initiates the method 300 to facilitate securing of air-to-ground communications either automatically or in response to operator interaction.

The initiation of method 300 by the aircraft 100 is now described. While at the gate prior to departure, the aircraft communication system 110 receives a flight plan (with information indicative of a preferred flight path) and determines the ground entities with which it expects to communicate during the flight (block 302). The information indicative of the preferred flight path includes the identity of ground entities with which the aircraft needs to communicate while it travels on the preferred flight path. The determination of ground entities is based on information such as departure airport, arrival airport, the preferred flight path, and alternate flight paths/airports. One possible source of this information is the aircraft navigation system 10. In one implementation of this embodiment, ground entities are determined for preferred flight paths and at least one alternate flight path. In some embodiments, there is only the preferred flight path in the flight plan. In another implementation of this embodiment, some of the ground entities, such as airline operations (dispatch and maintenance) are pre-configured.

If valid/current security management information (e.g., certificates, certificate revocation lists) for the identified ground entities is not stored in the aircraft, communication system 110 the aircraft communication system 110 requests security management information (SM Info) (402 in FIG. 4) for the identified ground entities from a PKI Certificate Distribution Service 80 using broadband data links 550, 501, and 503 (FIG. 1) that are available while the aircraft 100 is parked at the gate.

The same process is used to update (e.g., renew or replace) security management information (e.g., keys, certificates) associated with the aircraft 100 itself. Specifically, the aircraft communication system 110 determines if security management information of the aircraft 100 is valid. If the aircraft communication system 110 determines that the security management information of the aircraft 100 is invalid, the aircraft communication system 110 renews the security management information of the aircraft 100.

The initiation of method 300 by the airline dispatch 55 is now described. While at the gate prior to departure, the airline dispatch 55 receives a flight plan (including information indicative of a preferred flight path) and determines the ground entities with which the aircraft 100 is expected to communicate during the flight (block 302). The airline dispatch 55 determines the ground entities based on information such as departure airport, arrival airport, the preferred flight path, and alternate flight paths/airports. The airline dispatch 55 requests security management information (e.g., keys, certificates, certificate revocation lists) for the identified ground entities 202, 204, and 206 from the PKI Certificate Distribution Service 80 via the ground-to-ground network 60 (404 in FIG. 4). The same process may be used to update (e.g., renew or replace) security management information (e.g., keys, certificates) associated with the aircraft 100 itself.

The requested security management information (including a certificate revocation list) is transmitted to the aircraft communication system 110 using the broadband data link 550 available while the aircraft 100 is parked at the gate (406 in FIG. 4). The security management information is received at the aircraft 100 via the broadband data link 550 and 551 prior to takeoff of the aircraft 100 (block 304).

The aircraft communication system 110 validates the security management information for the ground entities prior to take off of the aircraft 100 (block 306 in FIGS. 3 and 408 in FIG. 4). For example, the processor 130 in aircraft communication system 110 validates certificate and certificate revocation list signatures and checks both received and previously stored certificates against the certificate revocation list. If one or more certificate associated with one or more of the ground entities is on the certificate revocation list, the aircraft communication system 110 requests and obtains a new certificate for each ground entity determined to be on the certificate revocation list via the broadband data link 550 (402 in FIG. 4).

The aircraft communication system 110 stores validated security management information 165 in local (on-aircraft) storage, such as memory 160 (block 308 in FIGS. 3 and 410 in FIG. 4).

In some embodiments, the aircraft communication system 110 uses the validated security management information to establish secure associations with ground entities 202, 204, and 206 with which it expects to communicate via the broadband data links 550 and 501 (block 310 in FIG. 3). As shown at 412 in FIG. 4, the secure associations are established with the first ground entity (such as ground entity 202 in FIG. 1). As shown at 414 in FIG. 4, the secure associations are established with the second ground entity (such as ground entity 204 in FIG. 1). As shown at 416 in FIG. 4, the secure associations are established with the $n^{th}$ ground entity (such as ground entity 204 in FIG. 1). Once a secure association is established with a ground entity, the security parameters associated with the secure association for that ground entity are stored in memory 160.

In one implementation of this embodiment, a secure association is established with the current air traffic service provider (ATSP) using aeronautical telecommunications network/open system interconnect (ATN/OSI) (ICAO Doc. 9880). In another implementation of this embodiment, a secure association is established with the aeronautical telecommunications network/internet protocol suite (ATN/IPS) (ICAO Doc. 9896). In yet another implementation of this embodiment, a secure association is established with airline operations/dispatch (or other airline-designated third-party service providers) using ACARS Message Security (ARINC 823).

In one implementation of this embodiment, the aircraft communication system 110 uses the validated security management information (e.g., certificates) to establish secure associations (e.g., peer secure session and session keys) with ground entities 202, 204, and 206 while in-flight and block 310 does not occur. In another implementation of this embodiment, the aircraft communication system 110 uses the validated security management information to establish secure associations with at least one ground entity while in-flight and uses the validated security management information to establish secure associations with at least one other ground entity via the broadband data links prior to takeoff.

Once the aircraft 100 has left the gate or ground 15, broadband links may no longer be available or, if available, may not be certified for some uses. In either case, after (or during) takeoff the aircraft 100 shifts from using broadband data link to using bandwidth-constrained data links when the aircraft 100 takes off from the ground 15 (418 in FIG. 4). Some exemplary bandwidth-constrained data links include VHF, VHF Data link Mode 2 (VLDm2), Classic Aero SATCOM. Other bandwidth-constrained data links are possible.

The aircraft communication system exchanges protected messages (i.e., sends protected downlink messages, receives protected uplink messages) with ground entities using validated security management information or using secure associations established previously (block 312 and 420-423 in FIG. 4). The aircraft communication system 110 uses the stored validated security management information or the security parameters in order to exchange the protected messages, while in-flight, with the ground entities that are communicatively coupled with the aircraft 100 traveling along a flight path. In an embodiment in which the secure associations were not established prior to takeoff, the aircraft communication system 110 uses the validated security management information to establish the secure associations during the flight. In an embodiment in which the secure associations were established prior to takeoff, the aircraft communication system 110 uses the security parameters associated with the secure associations for the ground entities established prior to takeoff to protect messages exchanged with the communicatively coupled ground entities while in flight.

If broadband data link are not available, the aircraft communication system 110 implements bandwidth-constrained data links (such as bandwidth-constrained data link 322, 324, or 326) to exchange the protected messages with the communicatively coupled ground entities while in-flight. For clarity of viewing FIG. 4, the transactions representative of an exchange of protected messages between the second ground entity 204 and the aircraft 100 over the bandwidth-constrained data link 324 are not shown.

The proposed system and method to facilitate securing of air-to-ground communications can be implemented as a software solution, a hardware solution, and/or a combination of software and hardware solution. Embodiments of the methods and systems described herein are implemented as a software function on an avionics platform that manages air/ground security and/or air/ground data link connectivity. One embodiment implements a software function on a Communication manager/Function (CMU/CMF) either as a stand-alone Line Replaceable Unit (LRU) or as an integrated platform.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method to facilitate securing of air-to-ground communications, the method comprising:
   receiving security management information at the aircraft via at least one broadband data link prior to takeoff of the aircraft, wherein the security management information is received for ground entities that can be communicatively coupled with the aircraft traveling on a flight path, the security management information including certificates for the respective ground entities;
   validating the security management information for the ground entities;

storing the validated security management information for the ground entities in the aircraft, wherein the validating and storing security management information occur prior to takeoff of the aircraft;

establishing secure associations with the ground entities via the at least one broadband data link, the secure associations being based on the validated security management information, wherein the establishing secure associations occurs prior to takeoff of the aircraft; and managing previously established secure associations to communicate with the ground entities, via either at least one broadband data link or at least one bandwidth-constrained data link, while in-flight.

2. The method of claim 1, further comprising:
storing in the aircraft security parameters associated with the secure associations for the ground entities.

3. The method of claim 2, further comprising:
using the stored security parameters established prior to takeoff to exchange protected messages, while in-flight, with the ground entities that are communicatively coupled in with the aircraft traveling along the flight path.

4. The method of claim 3, further comprising:
implementing the at least one bandwidth-constrained data link to exchange the protected messages with the communicatively coupled ground entities while in-flight.

5. The method of claim 1, further comprising establishing secure associations with the ground entities during the flight based on the validated security management information.

6. The method of claim 1, further comprising:
determining if the security management information of the aircraft is valid prior to take off; and
renewing the security management information of the aircraft based on a negative determination of the validity of the security management information of the aircraft.

7. The method of claim 1, wherein receiving the security management information comprises:
receiving a certificate revocation list via a broadband data link, and
wherein the validating the security management information for each ground entities comprises:
validating certificate revocation list signatures;
determining if one or more of the certificates associated with one or more of the ground entities is on the certificate revocation list, wherein receiving the security management information further comprises obtaining a new certificate for each ground entity determined to be on the certificate revocation list via the at least one broadband data link.

8. The method of claim 7, wherein determining if one or more of the certificates associated with one or more of the ground entities is on the certificate revocation list comprises:
checking received certificates associated with the ground entities against the certificate revocation list; and
checking previously stored certificates associated with the ground entities against the certificate revocation list.

9. The method of claim 1, further comprising:
requesting the security management information from a public key infrastructure certificate distribution service via at least one broadband data link.

10. The method of claim 1, further comprising:
receiving information indicative of a preferred flight path at the aircraft prior to takeoff, wherein the information indicative of the preferred flight path includes information indicative of at least one ground entity that can be communicatively coupled with the aircraft traveling on at least the preferred flight path.

11. The method of claim 10, further comprising:
receiving information indicative of an alternative flight path at the aircraft prior to takeoff, wherein the information indicative of the alternative flight path includes information indicative of at least one ground entity that can be communicatively coupled with the aircraft traveling on at least the alternative flight path.

12. The method of claim 1, wherein the validating the security management information for the ground entities comprises:
determining if the certificate for any of the ground entities are stored in memory;
validating certificates and certificate revocation list signatures;
checking received certificates against a certificate revocation list; and
checking previously stored certificates against the certificate revocation list.

13. A system to facilitate securing of air-to-ground communications for an aircraft, the system comprising:
a communication manager to:
receive security management information for at least one ground entity at the aircraft via at least one broadband data link prior to takeoff of the aircraft, the security management information including at least one certificate for the at least one ground entity;
validate the security management information for the at least one ground entity;
establish secure associations with the ground entities based on the validated security management information via the at least one broadband data link prior to takeoff of the aircraft; and
manage the previously established secure associations to communicate with the at least one ground entity in a flight path, via either at least one broadband data link or at least one bandwidth-constrained data link, while in-flight; and
a memory communicatively coupled to the communication manager to store a list of the at least one ground entity in the flight path, and the security management information for each ground entity in the flight path.

14. The system of claim 13,
wherein the memory is communicatively coupled to the communication manager to store security parameters associated with the secure associations for the at least one ground entity.

15. The system of claim 13, further comprising:
the at least one ground entity communicatively coupled to the ground-to-ground network;
at least one public key infrastructure certificate distribution service communicatively coupled to the ground-to-ground network to provide the security management information to the communication manager via at least one broadband data link; and
at least one certificate authority communicatively coupled to the ground-to-ground network to provide the security management information to the communication manager via the at least one broadband data link, wherein the communication manager is configured to receive data from at least one of the at least one ground entity, the at least one public key infrastructure certificate distribution service, and the at least one certificate authority prior to take-off of the aircraft.

16. A non-transitory computer readable storage medium storing computer interpretable instructions, which, when interpreted by a processor, cause the processor to perform a method to facilitate securing of air-to-ground communications for an aircraft, the method comprising:

receiving a flight plan at an aircraft, the flight plan including information indicative of ground entities that can be communicatively coupled with the aircraft traveling on a preferred flight path prior to takeoff of the aircraft;

checking certificates associated with the ground entities against a certificate revocation list received via at least one broadband data link prior to takeoff of the aircraft;

obtaining a new certificate for any ground entity determined to be on the certificate revocation list via the at least one broadband data link prior to takeoff of the aircraft;

validating security management information, including the certificates, received for the ground entities at the aircraft via at least one broadband data link prior to takeoff of the aircraft; and storing the validated security management information for the ground entities in the aircraft prior to takeoff of the aircraft;

establishing secure associations with the ground entities via the at least one broadband data link prior to takeoff of the aircraft, the secure associations being based on the validated security management information; and managing the previously established secure associations to communicate with the ground entities, via either at least one broadband data link or at least one bandwidth-constrained data link, while in-flight.

17. The computer readable storage medium storing computer interpretable instructions of claim 16, which cause the processor to perform the method to facilitate securing of air-to-ground communications for the aircraft, the method further comprising:

storing in the aircraft security parameters associated with the secure associations for the ground entities.

18. The computer readable storage medium storing computer interpretable instructions of claim 17, which cause the processor to perform the method to facilitate securing of air-to-ground communications for the aircraft, the method further comprising:

using the stored security parameters established prior to takeoff in order to exchange protected messages, while in-flight, with the ground entities that are communicatively coupled with the aircraft traveling along the preferred flight path; and implementing the at least one bandwidth-constrained data link to exchange the protected messages with the communicatively coupled ground entities while in-flight.

19. The computer readable storage medium storing computer interpretable instructions of claim 16, which cause the processor to perform the method to facilitate securing of air-to-ground communications for the aircraft, the method further comprising:

receiving certificates for any ground entities not having certificates associated with the ground entities stored in a memory of the aircraft via the at least one broadband data link prior to takeoff of the aircraft;

checking the received certificates associated with the ground entities against the certificate revocation list prior to takeoff of the aircraft; and checking previously stored certificates associated with the ground entities against the certificate revocation list prior to takeoff of the aircraft.

20. The computer readable storage medium storing computer interpretable instructions of claim 16, which cause the processor to perform the method to facilitate securing of air-to-ground communications for the aircraft, the method further comprising:

receiving a flight plan including information indicative of ground entities that can be communicatively coupled with the aircraft traveling on an alternative flight path prior to takeoff.

* * * * *